(12) United States Patent
Yu et al.

(10) Patent No.: US 7,765,097 B1
(45) Date of Patent: Jul. 27, 2010

(54) AUTOMATIC CODE GENERATION VIA NATURAL LANGUAGE PROCESSING

(75) Inventors: Jay Jie-Bing Yu, Carlsbad, CA (US); Adam M. Fleming, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 739 days.

(21) Appl. No.: 11/385,319

(22) Filed: Mar. 20, 2006

(51) Int. Cl.
*G06F 17/27* (2006.01)
(52) U.S. Cl. .......................................... 704/9; 717/144
(58) Field of Classification Search .................... 704/9; 717/144
See application file for complete search history.

(56) References Cited

U.S. PATENT DOCUMENTS

| | | | |
|---|---|---|---|
| 5,640,576 A * | 6/1997 | Kobayashi et al. | 704/9 |
| 6,353,925 B1 * | 3/2002 | Stata et al. | 717/112 |
| 6,714,939 B2 * | 3/2004 | Saldanha et al. | 707/102 |
| 7,027,974 B1 * | 4/2006 | Busch et al. | 704/4 |
| 7,356,458 B1 * | 4/2008 | Gonos | 704/8 |
| 2003/0046061 A1 * | 3/2003 | Preston et al. | 704/9 |
| 2004/0221278 A1 * | 11/2004 | Dankel et al. | 717/139 |
| 2004/0225999 A1 * | 11/2004 | Nuss | 717/114 |
| 2005/0283758 A1 * | 12/2005 | Cobcroft et al. | 717/113 |
| 2006/0007189 A1 * | 1/2006 | Gaines et al. | 345/179 |
| 2006/0009962 A1 * | 1/2006 | Monk | 704/4 |
| 2006/0212845 A1 * | 9/2006 | Davidson et al. | 717/113 |
| 2007/0005342 A1 * | 1/2007 | Ortscheid | 704/9 |

OTHER PUBLICATIONS

Bos, J., Clark, S., Steedman, M., Curran, J. R., & Hockenmaier, J. (2004). Wide-coverage semantic representations from a CCG parser. In Proceedings of the 20th International Conference on Computational Linguistics, pp. 1240-1246.*

Proceedings of the Australasian Language Technology Workshop 2005, pp. 191-199, Sydney, Australia, Dec. 2005.*

Begel, A. Programming By Voice: A Domain-specific Application of Speech Recognition. AVIOS Speech Technology Symposium-SpeechTek West (2005).*

S. C. Arnold, L. Mark, and J. Goldthwaite, "Programming by voice, VocalProgramming," presented at Proceedings of the fourth international ACM conference on Assistive technologies, Arlington, Virginia, United States, 2000.*

(Continued)

*Primary Examiner*—Talivaldis I Smits
*Assistant Examiner*—Greg A Borsetti
(74) *Attorney, Agent, or Firm*—Osha • Liang LLP

(57) ABSTRACT

A method for automatic code generation that includes obtaining a parse tree, wherein the parse tree represents at least one instruction and wherein the instruction is in a natural language, and wherein the at least one instruction is free-form, determining a plurality of sentence subparts from the parse tree, creating at least one instantiated concept for each of the plurality of sentence subparts, inserting the instantiated concept in an instantiated concept map, traversing the instantiated concept map, wherein traversing the instantiated concept map includes for each instantiated concept in the instantiated concept map obtaining a code output rule according to the instantiated concept, and outputting code according to the code output rule be completed upon finalization of claims.

13 Claims, 9 Drawing Sheets

OTHER PUBLICATIONS

C. V. Lopes, P. Dourish, D. H. Lorenz, and K. Lieberherr. Beyond AOP: Toward naturalistic programming. In Proceedings Onward! Track at OOPSLA'03, Anaheim, 2003. ACM Press.*

Andrew Begel. Spoken language support for software development. Qualifying examination proposal, Dec. 2000.*

Y.-Y. Wang and A. Acero, "Concept Acquisition in Example-Based Grammar Authoring." In the Proceedings of ICASSP, Hong Kong, China, 2003.*

Sugimoto et al. "Towards Programming in Everyday Language: A Case for Email Management" CICLing 2004.*

Nozomu Kaneko, Takehisa Onisawa: "End-User Programming by Linguistic Expression employing Interaction and Paraphrasing", Proc. of SCIS & ISIS 2004, Keio Univ, Japan (2004).*

Desilets. "VoiceGrip: A Tool for Programming-by-Voice" pp. 103-116, 2001.*

Begel et al. "Spoken Programs" IEEE 2005.*

Viola et al. "Learning to Extract Information from Semistructured Text using a Discriminative Context Free Grammar" SIGIR'05, Aug. 15-19, 2005.*

Price et al. "Off to See the Wizard: Using a "Wizard of Oz" Study to Learn Howto Design a Spoken Language Interface for Programming" Nov. 6-9, 2002.*

Linhalis, F.; Moreira, D.A. Semantic Mapping between UNL Relations and Software Components to the Execution of Natural Language Requisitions. In: International Information and Telecommunication Technologies Symposium (I2TS'04), 3., 2004, São Carlos. Proceedings.*

Liu et al. "Programmatic Semantics for Natural Language Interfaces" CHI 2005.*

Liu, Hugo, Lieberman, Henry, "Metafor: Visualizing Stories as Code", IUI'05, Jan. 10-13, 2005, 3 pages.

Liu, Hugo, Lieberman, Henry, Programmatic Semantics for Natural Language Interfaces, CHI 2005, Apr. 2-7, 2005, 4 pages.

Liu, Hugo, Lieberman, Henry, "English: The Lightest Weight Programming Language of the All", Simplicity, at the MIT Media Laboratory in Cambridge, Massachusetts, 2004, 22 pages.

Price, David, Riloff, Ellen, Zachary, Joseph, Harvey, Brandon, "NaturalJava: A Natural Language Interface for Programming in Java", Department of Computer Science, University of Utah, 2000, 5 pages.

* cited by examiner

| | | |
|---|---|---|
| 430 | If Condition | • Output "If" operator<br>• Output Pre-Condition<br>• Output Post-Condition |
| 432 | And Condition | • Output "And" operator<br>• Output Left Condition<br>• Output Right Condition |
| 434 | Not Condition | • Output "Not" operator<br>• Output Sub-Condition |
| 436 | Claim Action | • Output "CanClaim" operator<br>• Output Subject<br>• Output Object |
| 438 | Filing Status | • Output Person Context<br>• Output "=="<br>• Output Attribute Value |
| 440 | Enter Action | • Output Field Name<br>• Output "=="<br>• Output Attribute Value |

AUTOMATIC CODE GENERATION VIA NATURAL LANGUAGE PROCESSING

BACKGROUND

Every year millions of people, companies, and other institutions file various documents with the different governing bodies, such as agencies and services of local, state and national governments. The documents typically are directed toward such things as filing taxes, inventory and accounting filings, medical reimbursement filings, and the like.

Each document is typically designed around the concept of forms. A form includes several data-containing fields and static text describing and relating to the fields. The fields may be user-generated or calculated. A user-generated field is a field which has data from the user or outside resource. A calculated field is a field in which the data is calculated using data in other fields (e.g., user-generated fields and/or calculated fields).

Static text that is used in a form is generally used to instruct the user on how to enter the data in the field. Specifically, the static text may include information for calculating the value for the field. For example, the static text may include the instruction "add field_1, field_2, and field_3 and enter total in field_4". The static text may also specify parameters for entering data in the field. For example, the static text may include the instruction "if born before 1934 and have three children, then enter 1, otherwise enter 2". Accordingly, the static text describes how the user generated and calculated fields are to be entered.

Typically, software products are used for simplifying the input of data into the fields. Specifically, a software product may include software instructions to request data using user-friendly questions and automatically insert the data into several fields. By using an easy-to-use user interface, a user is able to navigate the complex documents and ensure compliance with the instructions in the field.

Before the software product can be used, the code for the product must be written using a programming language. Writing the code for a field is often performed by a programmer. Specifically, a programmer reads the document, determines the relevant static text and determines what code should be entered in the field in order to comply with any instructions specified in the static text. Only after the programmer has performed the operation for all fields may the software product be ready to be bought and used by consumers.

SUMMARY

In general, in one aspect, the invention relates to a method for automatic code generation that includes obtaining a parse tree, wherein the parse tree represents at least one instruction and wherein the instruction is in a natural language, and wherein the at least one instruction is free-form, determining a plurality of sentence subparts from the parse tree, creating at least one instantiated concept for each of the plurality of sentence subparts, inserting the instantiated concept in an instantiated concept map, traversing the instantiated concept map, wherein traversing the instantiated concept map includes for each instantiated concept in the instantiated concept map obtaining a code output rule according to the instantiated concept, and outputting code according to the code output rule.

In general, in one aspect, the invention relates to a system for automatic code generation that includes a pattern matcher configured to obtain a parse tree, wherein the parse tree represents at least one instruction and wherein the instruction is in a natural language, determine a plurality of sentence subparts from the parse tree, create at least one instantiated concept for each of the plurality of sentence subparts, and insert the instantiated concept in an instantiated concept map. The system further includes a code generator configured to traverse the instantiated concept map, wherein traversing the instantiated concept map that includes for each instantiated concept in the instantiated concept map obtaining a code output rule according to the instantiated concept and output code according to the code output rule.

In general, in one aspect, the invention relates to a computer readable medium comprising computer program code embodied therein for causing a computer system to obtain a parse tree, wherein the parse tree represents at least one instruction and wherein the instruction is in a natural language, and wherein the instruction is free-form, determine a plurality of sentence subparts from the parse tree, create at least one instantiated concept for each of the plurality of sentence subparts, insert the instantiated concept in an instantiated concept map, traverse the instantiated concept map, wherein traversing the instantiated concept map comprise for each instantiated concept in the instantiated concept map: obtaining a code output rule according to the instantiated concept, and output code according to the code output rule.

In general, in one aspect, the invention relates to a data structure for storing an instantiated concept map that includes a first element comprising a first instantiated concept, wherein the instantiated concept represents a word in a natural language instruction, a second element comprising a second instantiated concept, wherein the second instantiated concept is a child of the first instantiated concept, and wherein the second instantiated concept identifies a sentence subpart.

Other aspects of the invention will be apparent from the following description and the appended claims.

BRIEF DESCRIPTION OF DRAWINGS

FIGS. 5A-5D shows an example of automatic code generation in accordance with one or more embodiments of the invention.

DETAILED DESCRIPTION

Figure 1:
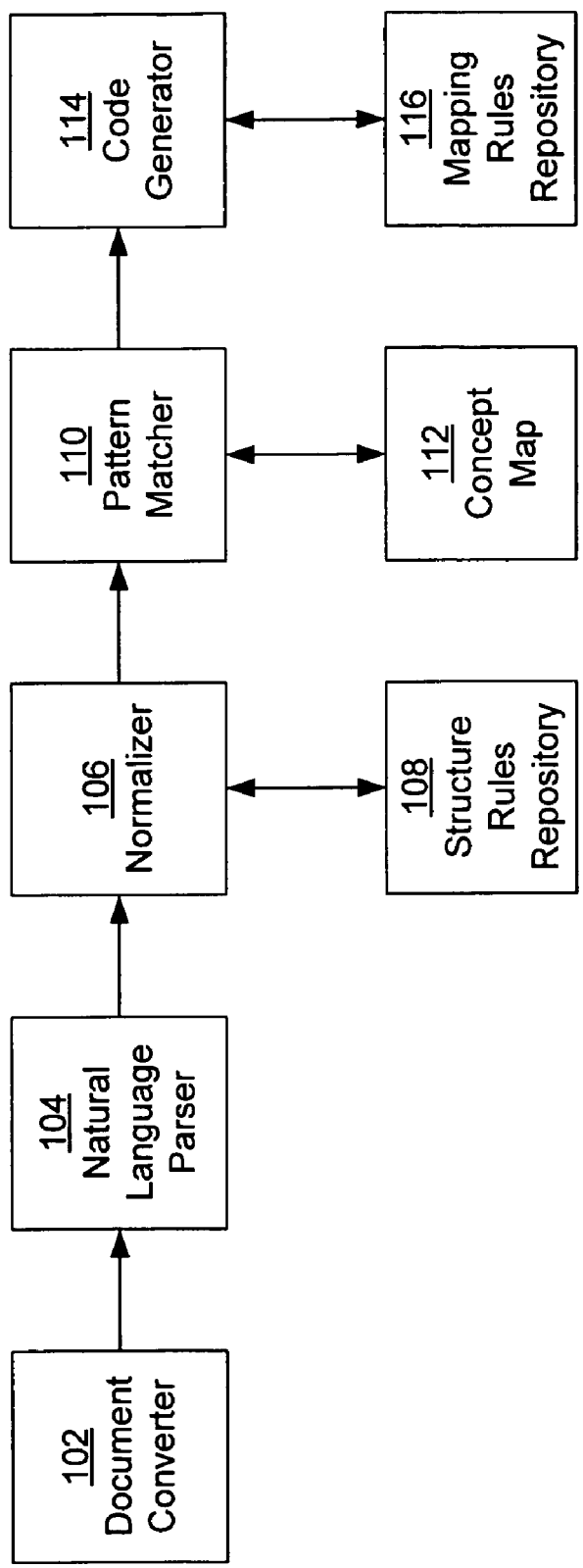
FIG. 1 shows a flow diagram of a system for automatic code generation in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for converting written instructions into code. Specifically, embodiments of the invention provide a method for performing natural language processing of written instructions associated with fields within a form. More specifically, embodiments of the invention extract instructions from a document into sentences. The sentences may then be transformed into a code in virtually any programming language using a parse tree and an instantiated concept map.

FIG. 1 shows a flow diagram of a system for automatic code generation in accordance with one or more embodiments of the invention. Specifically, FIG. 1 shows a system for converting a document written in a natural language into code written in a programming language. A natural language corresponds to any language used for communication between humans. The document may initially be in virtually any type of document format, such as portable document format (PDF), paper copy, tagged image file format (TIFF), or any other document format.

In one or more embodiments of the invention, the document uses the concept of forms and fields. Specifically, the document is composed of at least one form that has at least one field. For example, the document may correspond to an official document (i.e., internal revenue service document, inventory document, health care document, accounting document, or other such official documents). The document also includes static text presented (e.g., written or spoken) in a natural language (e.g., French, English, German, Greek, Korean, or any other language). The static text may include both extraneous information (e.g., document identifying information) as well as instructions. The instructions describe how data should be calculated. Specifically, instructions define the business logic for determining how a value should be entered into the field. Further, in one or more embodiments of the invention, the instructions are free-form. Specifically, the terminology and format of the instructions are not constrained by requirements outside of the grammatical rules of the natural language.

As shown in FIG. 1, the system for automatic code generation includes a document converter (102), a natural language parser (104), a normalizer (106), a structure rule repository (108), a pattern matcher (110), a concept map (112), a code generator (114), and a mapping rule repository (116). Each of these components is described below.

A document converter (102) corresponds to a component that includes functionality to extract instructions from the document. Specifically, the document converter (102) includes functionality to remove the extraneous information from the document and parse the remaining text into natural language instructions. Further, the document converter (102) may also include functionality to replace lost information, such as line numbers that is implicit in the document. In one or more embodiments of the invention, the output of the document converter (102) is extensible markup language (XML). However, those skilled in the art will appreciate that virtually any format for output may be used. The document converter (102) may correspond to a person or a program executing on one or more computers.

The document converter (102) is connected to a natural language parser (104). The natural language parser (104) includes functionality to parse instructions based on the grammar of the natural language. Specifically, the natural language parser (104) includes functionality to understand the grammatical structure of the instruction and group words in the instruction into units or phrases. The output of the natural language parser (104) is a parse tree to represent a hierarchical relationship between nodes. In one or more embodiments of the invention, each leaf node in the parse tree is a token. A token is one or more characters that cannot be divided while maintaining a meaning in the natural language. In one or more embodiments of the invention, each non-leaf node in the parse tree represents the parts of the sentence (e.g., declarative clause, adjective, verb phrase, etc.). Accordingly, a parse tree is a data structure that shows the relationship between different tokens using the grammar of the natural language.

In the output of the natural language parser, a child node is a part of the parent node. For example, the sentence "you must report all of your income" in the parse tree has a simple declarative clause for a root. The root node is a node representing a simple declarative clause. The root has children of a node representing a noun phrase and a node representing a verb phrase. The noun phase has as a child a node representing a personal pronoun. The child of the personal pronoun is a node with the word "you." The verb phrase may be parsed in a similar manner to the noun phrase. Accordingly, in one or more embodiments of the invention, the leaves of the tree represent individual words or punctuation.

In one or more embodiments of the invention, a Stanford Natural Language Parser (developed by The Stanford Natural Language Processing Group at Stanford University located in Stanford, California) is used. Those skilled in the art will appreciate that several types of natural language parser exist that may be used. Further, those skilled in the art will appreciate that while the parser is described with reference to a tree structure, a tree defines relationships between nodes in the tree. Thus, the actual output of the parser may be implemented using virtually any data structure.

Continuing with FIG. 1, the natural language parser (104) is connected to a normalizer (106). The normalizer (106) corresponds to a component that includes functionality to remove extraneous information (e.g., "the", "an", etc.) from the sentence and identify functional words (e.g., if, then, and, or, etc.) in the sentence. A functional word in the sentence is a word that allows the sentence to be broken into sentence subparts (i.e., smaller portions of the sentence) in order for the sentence subparts to be processed within the context of the functional word. For example, the word "if" specifies a conditional expression. Accordingly, the phrase after the "if" refers to the condition and the phrase before the "if" or after a comma is the action to be performed.

Two or more functional words are related when the related functional words operate together to divide the sentence into subparts. For example, an "if" and a comma are related functional words when the comma follows the "if". Other examples include "either"/"or", "if"/"than", etc.

In one or more embodiments of the invention, a structure rule repository (108) corresponds to a storage unit (e.g., file, database, spreadsheet, etc.) for maintaining structural rules. A structural rule corresponds to a rule for specifying which words are functional words and the grammatical pattern surrounding the functional word. In the aforementioned "if" example, a structure rule specifying a grammatical pattern for a simple "if" condition may specify that the sentence follows the regular expression of a subordinate clause followed by a "," followed by an optional noun phrase, followed by a verb phrase.

Besides a structure rules repository (108), a pattern matcher (110) may also be connected to the normalizer (106). A pattern matcher (110) corresponds to a component that includes functionality to generate an instantiated concept map from the normalized parse tree. In one or more embodiments of the invention, an instantiated concept map corresponds to a language independent representation of an instruction. An instantiated concept map includes instantiated concepts. A concept corresponds to a domain specific object definition. Specifically, in one or more embodiments of the invention, a concept corresponds to a type of object that has both a name and at least one property. A name corresponds to the name of the object and a property corresponds to the type of object or how the object relates to other concepts.

Further, in one or more embodiments of the invention, each concept in the concept map (112) includes a manifest. A manifest corresponds to a list of words or regular expressions in a natural language. Specifically, in one or more embodiments of the invention, the pattern matcher (110) uses the words in the manifest associated with a concept to determine whether the concept is a potential match. For example, a concept corresponding to the mathematical operator "add" may have a manifest that identifies the words of "sum", "combine", "add", etc. that are potential matches for the concept "add."

Continuing with FIG. 1, the pattern matcher (110) is connected to a concept map (112) in accordance with one or more embodiments of the invention. A concept map (112) is a semantic model. Specifically, the concept map (112) shows the semantic relationships between concepts. In one or more embodiments of the invention, a concept map (112) describes at least two types of relationships.

The first type of relationship is an inheritance hierarchy in which a child (or multiple children) is derived from at least one parent. Specifically, a child in the hierarchy is a type of the parent. For example, the word "add" is a type of math function. In one or more embodiments of the invention, the derived relationship is not necessarily a one-to-one or one-to-many relationship. For example, money is a type of value and a type of number. Accordingly, a child in the concept map is connected to the parent.

The second type of relationship within a concept map is a containment relationship. Specifically, a parent is connected to a child if the parent requires the child as a parameter. For example, if the "+" sign requires two real numbers as parameters, then two real numbers are the children of the "+" sign. The parent may correspond to an arithmetic operation (e.g., "+") or a functional operation (e.g., "add( )").

Accordingly, a concept in the concept map may be simultaneously related to other concepts by inheritance and parameters. For example, the concept map (112) may include the information that word "add" in an instruction is a type of "function" with two or more parameters of type "value," and "value" has two derived types of "money" and "total". In the aforementioned example, "add", "function", "value", "money", and "total" are concepts connected using the aforementioned relationships in accordance with one or more embodiments of the invention.

In addition to a concept map (112), a code generator (114) is also connected to a pattern matcher (110). The code generator (114) includes functionality to traverse the instantiated concept map and generate code. The generated code may correspond to code written in virtually any programming language.

The code generator (114) is also connected to a mapping rules repository (116). The mapping rules repository (116) corresponds to a storage unit for rules to translate instantiated concepts in the concept map into code. Specifically, the mapping rules repository (116) correlate instances in the instantiated concept map with the code that should be outputted based on the instances. For example, the mapping rules repository (116) may include for an "add" function, the entry "for each parameter, output the parameter's identifier (e.g., field_1) and insert a "+" symbol between all parameters.

Figure 2:
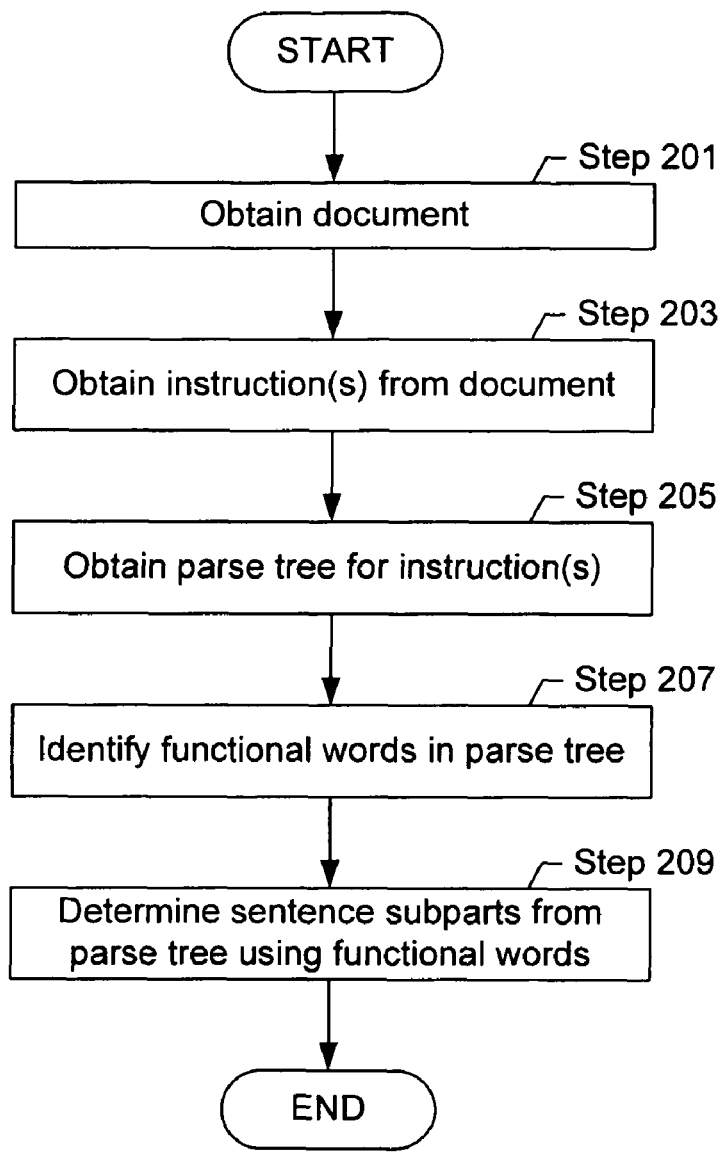
FIG. 2 shows a flowchart of a method for initializing automatic code generation in accordance with one or more embodiments of the invention.

FIG. 2 shows a flowchart of a method for initializing automatic code generation in accordance with one or more embodiments of the invention. Initially, the document is obtained (Step 201). The document may be obtained from a repository for documents (e.g., the Internet), scanned in from a paper copy, etc. Next, at least one instruction is obtained from the document (Step 203). Specifically, the extraneous information is removed from the document and the instruction(s) is associated with at least one field. In one or more embodiments of the invention, obtaining an instruction may be performed by a person that reads the document and copies the instruction into an input field or file. Alternatively, a script may be used that scans the document for fields and obtains the instructions related to a particular field.

After an instruction is obtained from the document, a parse tree for the instruction is obtained (Step 205). The parse tree for the instruction may be obtained by parsing the instruction, or inputting the instruction into a commercially available parser. Parsing an instruction into a parse tree may be performed, for example, by matching the grammatical part of the instruction with the grammatical rules of the natural language of the instruction.

Once the instruction is parsed into a parse tree, the functional words in the parse tree are identified (Step 207). Identifying the functional words in the parse tree may be performed by traversing the parse tree and search for words that belong to specific categories of words. Because the categories of words are also specified in the parse tree, the functional words may be found below the specific category to which the word belongs. For example, when a coordinating conjunction (e.g., "and") is a node in the parse tree, the child node of the coordinating conjunction node is determined to be a functional word in accordance with one or more embodiments of the invention.

Next, the sentence subparts are determined from the parse tree using the functional words (Step 209) in accordance with one or more embodiments of the invention. Determining the sentence subparts from the parse tree may be performed by searching the structure rule repository for the functional word. When the functional word is found, then the regular expression is obtained for the functional word. The regular expression specifies the different sentence subparts. In one or more embodiments of the invention, the sentence subparts matching the regular expression is at a similar distance from the root of the parse tree as the functional word.

Alternatively, a breadth-first-search of the parse tree may be used to determine the functional words and the sentence subparts. Specifically, in one or more embodiments of the invention, the functional words divide a sentence into subordinating clauses and simple declarative clauses. Accordingly, when a tag indicating the start of a subordinating clause or declarative clause is found in a sentence, a functional word(s) may be a child of the tag indicating the start of the subordinating clause and/or a tag at the same height as the subordinating clause or declarative clause.

Figure 3:
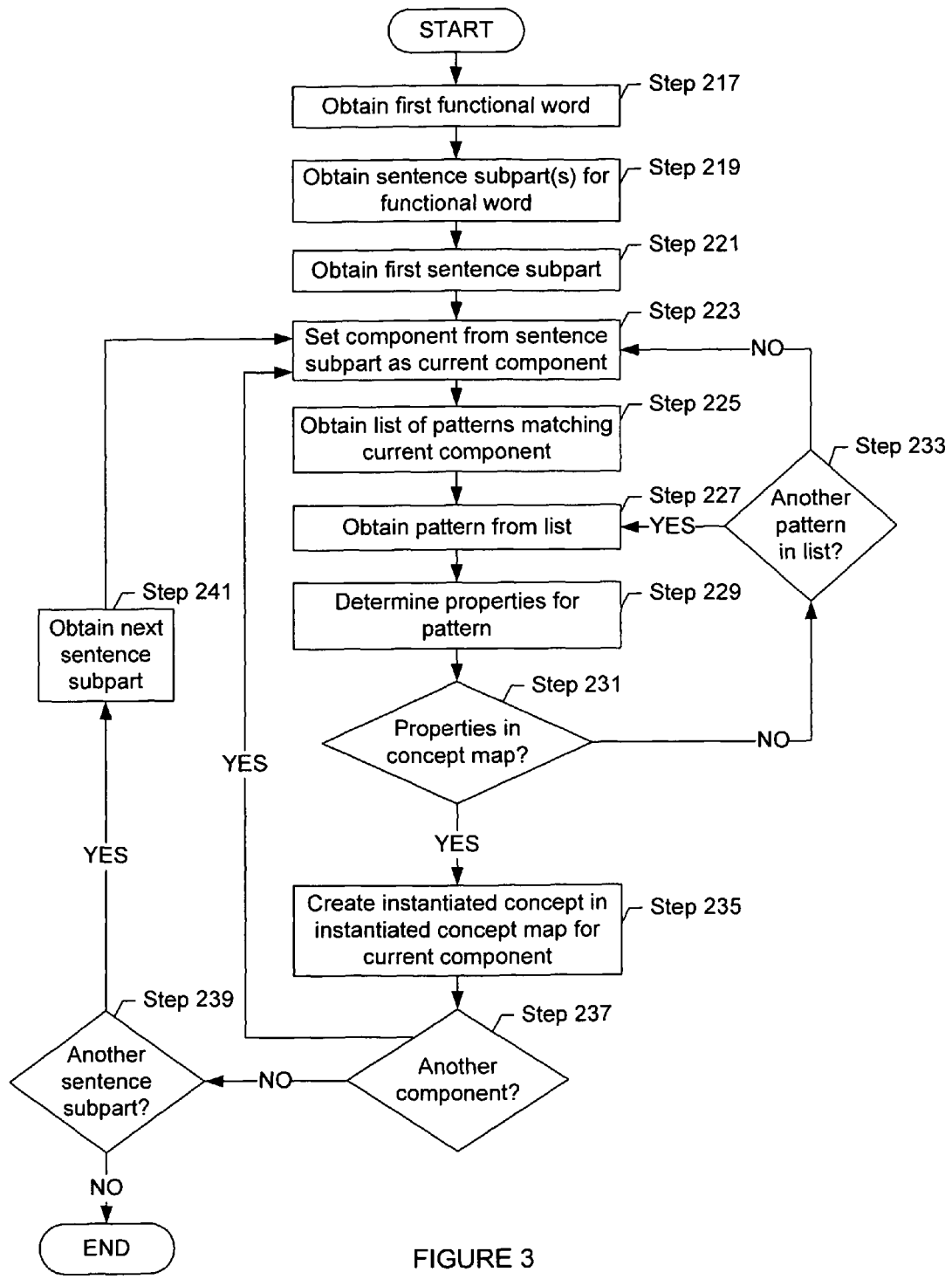
FIG. 3 shows a flowchart of a method for transforming a natural language to an instantiated concept map in accordance with one or more embodiments of the invention.

After determining the sentence subparts from the parse tree, the sentence subparts and functional words may be used to transform the instruction into an instantiated concept map in accordance with one or more embodiments of the invention. FIG. 3 shows a flowchart of a method for transforming a natural language to an instantiated concept map in accordance with one or more embodiments of the invention.

Initially, the first functional word is obtained (Step 217). In accordance with one or more embodiments of the invention, the first functional word is the first functional word in the sentence that is closest to the root.

After obtaining the first functional word, the sentence subparts for the functional word are obtained (Step 219). The sentence subparts may be obtained for the functional word from the parse tree (as described above). Next, the first sentence subpart is obtained from the sentence subparts for the functional word (Step 221). Specifically, the first sentence subpart is the first sentence subpart that appears in the sentence.

Next, a component in the sentence subpart is set as the current component (Step 223). The component that is set as the current component corresponds to any component in the sentence subpart that does not already map to a concept. In one or more embodiments of the invention, the current component may be a functional word or a non-functional word in the sentence subpart.

After setting a component as the current component, a list of patterns matching the current component is obtained (Step 225). Patterns belong to the list of patterns matching the current component if the pattern has a concept with matching types and/or name as the current component. If the component is another functional word, then the pattern describes a regular expression for components after the functional word. Alternatively, if the component is a non-functional word, then the pattern specifies a mapped word for the instantiated concept. For example, the pattern may specify that the word "you" should be mapped to "current user" in the instantiated concept.

Next, a pattern is obtained from the list of patterns (Step 227). Specifically, the properties for the obtained pattern corresponding to one or more concepts are determined. Accordingly, the properties of the concept are determined.

After determining the properties of the pattern, a determination is made whether the properties are in the instantiated concept map (Step 231). Specifically, if a pattern corresponds to a regular expression, then a determination is made whether the parameters in the regular expression are already in the instantiated concept map.

If the parameters are not in the instantiated concept map, then a determination is made whether another pattern exists in the list of patterns (Step 233). If another pattern exists, then the next pattern is obtained from the list. Once all patterns have been checked in the list and a pattern matching the component is not found, then the next component from the sentence subpart is obtained (Step 223).

For example, consider the scenario in which the sentence subpart corresponds to the input "sum line1, line2, and line3." In such a scenario, a pattern matcher may first identify that the word "sum" matches the "manifest" for the "add" concept. Accordingly, the "add" concept is marked as a potential match. Next, the pattern matcher examines the words "line1", "line2", "and line3." Upon examination and using the manifest of the different concepts, the pattern matcher matches "line1", "line2", "line3" to the "line identifier" concept. Afterwards, pattern matcher can examine all the candidate matches in the current subpart, and examine the properties of the "add" concept, such as that two or more parameters are required. Accordingly, the pattern matcher examines the "line identifier" concept to determine whether "line1", "line2", "line3" match the pattern of parameters. Because a parameter can be of type "variable" in the concept definition of "add", and "line identifier" is a type of "variable", the pattern matcher determines that the sentence subpart matches the "add" concept. Accordingly, an instantiation of the "add" concept and instantiations of the "line identifier" concept are created in the instantiated concept map.

In another example, consider the scenario in which the sentence subpart corresponds to the input "add an apple to the basket." In such a scenario, a pattern matcher may first identify that the word "add" matches the "manifest" for the "add" concept. Accordingly, the "add" concept is marked as a potential match. Next, the pattern matcher examines the words "apple" and "basket." Upon examination and using the manifest of the different concepts, the pattern matcher matches "apple" and "basket" to the "thing" concept. Afterwards, pattern matcher examines the properties of the "add" concept (e.g., at least two variables are required for the "add" concept). Accordingly, because "apple" and "basket" are not variable, the pattern matcher does not match "add" to the concept "add" in the instantiated concept map.

Those skilled in the art will appreciate that multiple algorithms exist that may also be used to find a pattern matching components in the sentence subpart. For example, a user may take the nouns and find the concepts to which the nouns map. The process may be repeated for the adjectives, adverbs, and the verbs. Finally, the process can complete by accessing the coordinating conjunctions.

Continuing with the algorithm shown in FIG. 3, if alternatively, a pattern is found that has properties in the instantiated concept map. Then an instantiated concept is created for the component in the instantiated concept map (Step 235). Alternatively, if the instantiated concept is a non-functional word and already exists in the instantiated concept map, then a link is created between the instantiated concept and the node the instantiated concept modifies in accordance with one or more embodiments of the invention. For example, if the sentence subpart is "your filing status is single," the instantiated concept for single modifies the instantiated concept for filing status. Accordingly, a link is created between the two instantiated concepts to show the relationship.

Once the instantiated concept is created in the instantiated concept map, then a determination is made whether another component exists in the sentence subpart (Step 237). Specifically, a determination is made whether another component is in the sentence subpart that does not already map to an instantiated concept. If another component does exist in the sentence subpart, then the next component is set as the current component.

Alternatively, if no more components exist in the sentence subpart, then a determination is made whether another sentence subpart exists (Step 239). If another sentence subpart exists, then the next sentence subpart is obtained (Step 241).

After all sentence subparts in a given instruction have been completed, then the instantiated concept map is completed. Accordingly, the code may now be generated using the instantiated concept map.

Figure 4:
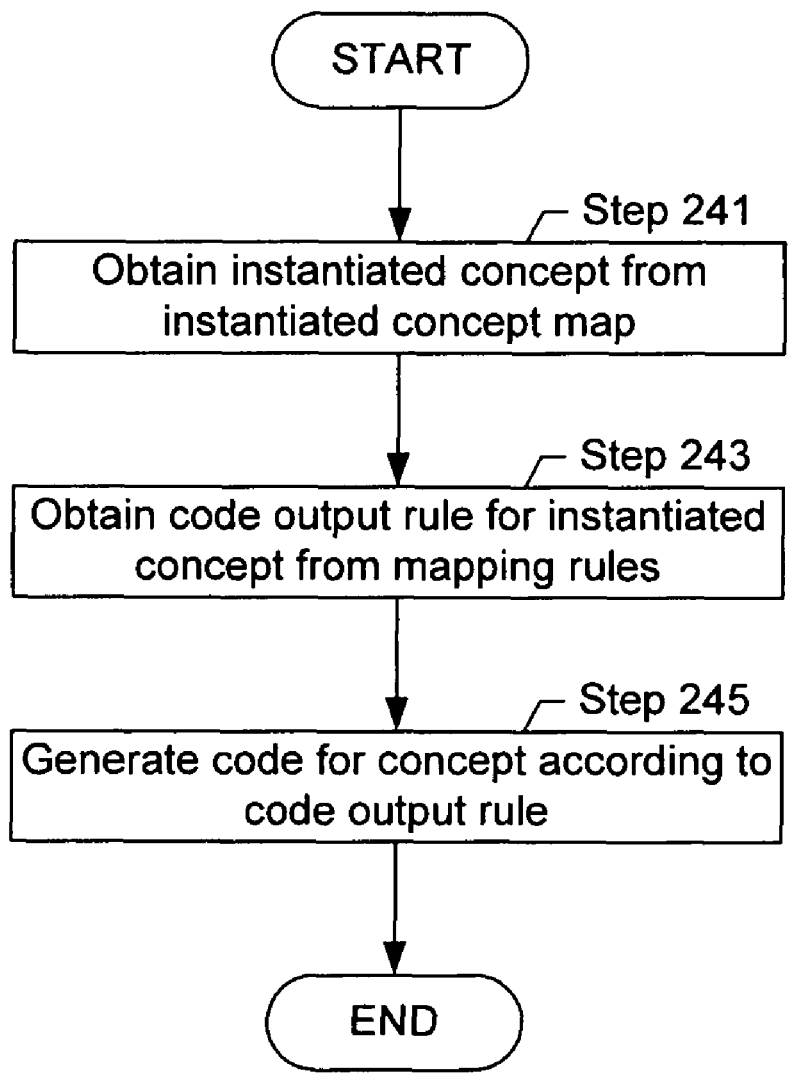
FIG. 4 shows a flowchart of a method for generating code in accordance with one or more embodiments of the invention.

FIG. 4 shows a flowchart of a method for generating code in accordance with one or more embodiments of the invention. Initially, an instantiated concept is obtained from the instantiated concept map (Step 241). The obtained instantiated concept corresponds to the first functional word described above. Next, the code output rule is obtained for the instantiated concept from the mapping rules (Step 243). The code may be obtained by performing a search in the mapping rules to determine which rule corresponds to the instantiated concept. After the code output rule is obtained for the instantiated concept from the mapping rules, code is generated for the instantiated concept according to the code output rule (Step 245).

In one or more embodiments of the invention, the code output rule specifies a recursive traversal of the instantiated concept map. Specifically, the code output rule may specify to output the concept of each sentence subpart. Accordingly, if the sentence subparts also correspond to a code output rule, then the sentence subparts may use the method described in FIG. 4 to generate code from the instantiated concept map.

Those skilled in the art will appreciate that iterative techniques are also possible. Specifically, rather than starting with the instantiated concept corresponding to the first functional word, the first instantiated concept may correspond to the minimum sentence subpart. More specifically, rather than a top-down approach for traversing the concept map, a bottom-up approach may also be possible.

Figure 5A:
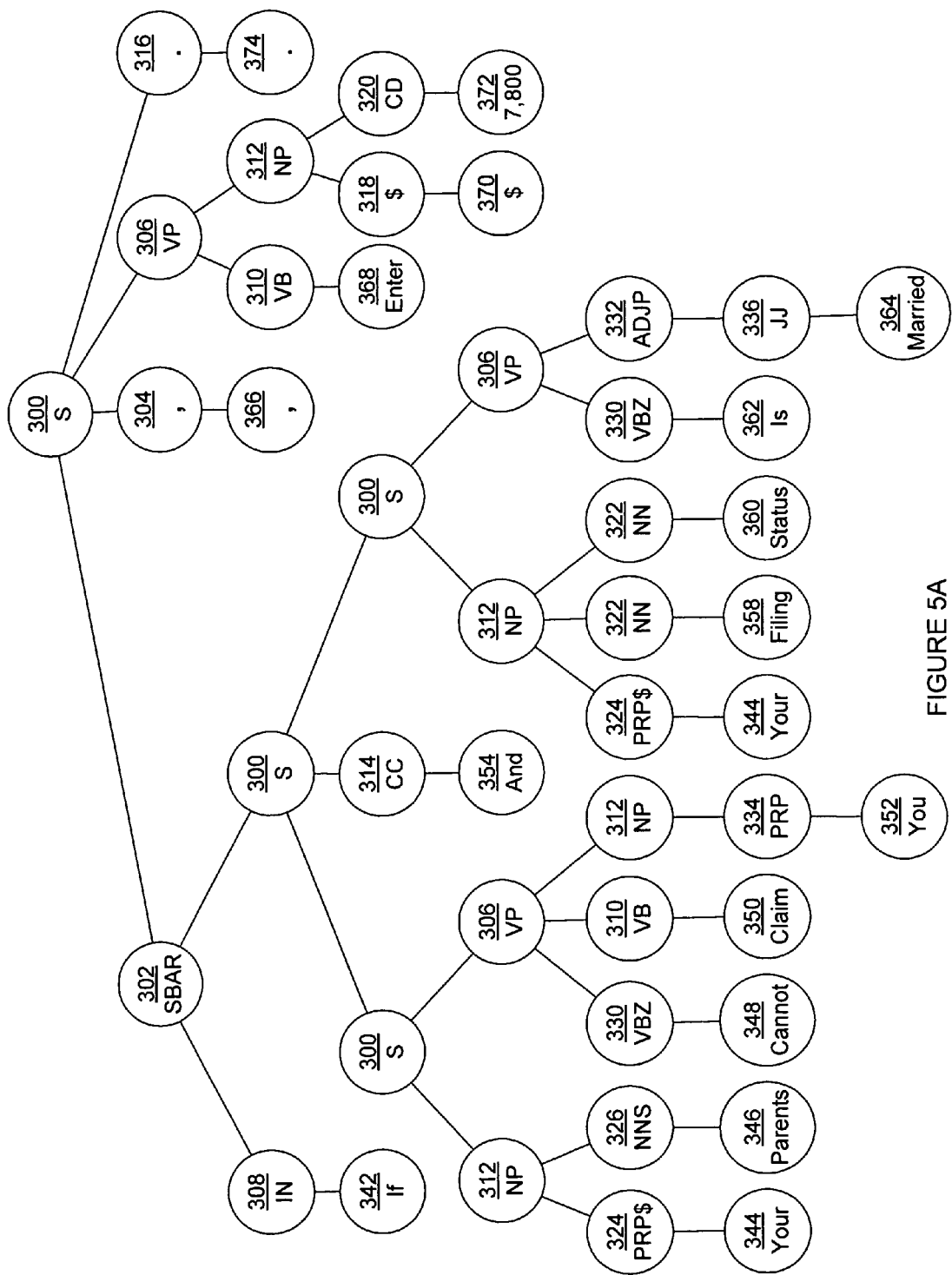

FIGS. 5A-5D shows an example of automatic code generation in accordance with one or more embodiments of the invention. For this example, consider the case in which the static text instruction states: "if your parents cannot claim you and your filing status is married, enter $7,800." FIG. 5A shows a parse tree for the example instruction in accordance with one or more embodiments of the invention.

In this example, the Penn Treebank Parts-of-Speech (POS) Tag-set (developed by the University of Pennsylvania located in Philadelphia, Pa.) is used. Specifically, in FIG. 5A, S (300) means that the subtree defined by S (300) as a root of the subtree is a simple declarative clause. SBAR (302) means that a subtree defined by SBAR (302) as a root of the subtree is a subordinate clause. The parent nodes (e.g., "," (304), "." (316), and "$" (318)) of punctuation and certain symbols, such as a comma, a period, and a dollar sign are given the same tag as the child (e.g., "," (366), "." (374), and "$" (370)). VP (306) means that a subtree defined by VP (306) (as a root of the subtree) is a verb phrase. IN (308) means that the child (e.g., "if" (342)) of IN (308) is a preposition. VB (310) means that the child (e.g., "enter" (368) and "claim" (350)) of VB (310) is a verb in base form. NP (312) means that a subtree defined by NP (312) (as a root of the subtree) is a noun phrase. CC (314) means that the child (e.g., "and" (354)) of CC (354) is a coordinating conjunction. CD (320) means that the child (e.g., "7,800" (372)) of CD (320) is a cardinal number. PRP$ (324) means that the child (e.g., "your" (344)) of PRP$ (324) is a possessive pronoun. NNS (326) means that the child (e.g., "parents" (346)) of NNS (326) is a plural noun. VBZ (330) means that the child (e.g., "cannot" (348) and "is" (362)) of VBZ (330) is a verb in third person singular present tense. NN (322) means that the child (e.g., "filing" (358) and "status" (360)) of NN (322) is a mass noun or singular noun. PRP (334) means that the child (e.g., "you" (352)) of PRP (334) is a personal pronoun. ADJP (332) means that a subtree defined by ADJP (332) (as a root of the subtree) is an adjective phrase. Finally, JJ (336) means that the child (e.g., "married" (364)) of JJ (336) is an adjective. Those skilled in the art will appreciate that while FIG. 5A shows a parse tree with the Penn Treebank POS tag-set, other tags may also be used.

As shown in FIG. 5A, each element (e.g., word, symbol, punctuation mark, etc.) is grouped in the parser into the parts of speech of the element using the grammar rules of English. Accordingly, determining which words are functional words may be performed by a search of the parse tree.

Figure 5B:
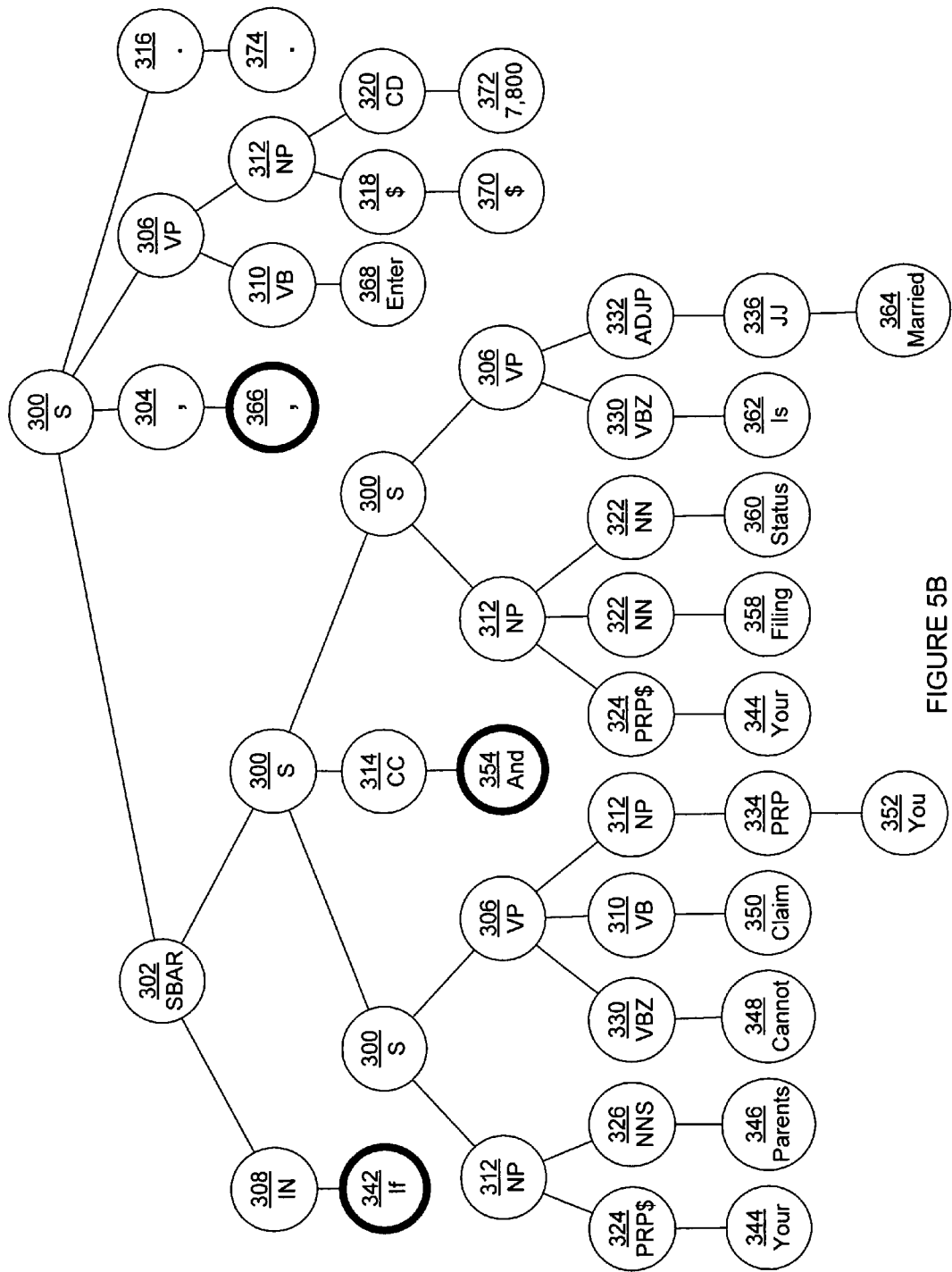

FIG. 5B shows the functional words marked in the parse tree in accordance with one or more embodiments of the invention. In FIG. 5B, the functional words (e.g., "if" (342), "and" (354), and "," (366)) are marked with a dark border. Finding the functional words may be performed by performing a search on the parse tree and determining where sentence subparts are created.

In the example shown in FIG. 5B, "if" (342) and "," (366) are related functional words that divide the sentence into a subordinate clause and a main clause (i.e., VP (306)). The word "and" divides the simple declarative clause into two simple declarative clauses.

Using the functional words, the sentence subparts for the example are "your parents cannot claim you and your filing status is married" and "enter $7,800". The first sentence subpart also has sentence subparts "your parents cannot claim you" and "your filing status is married".

Figure 5C:
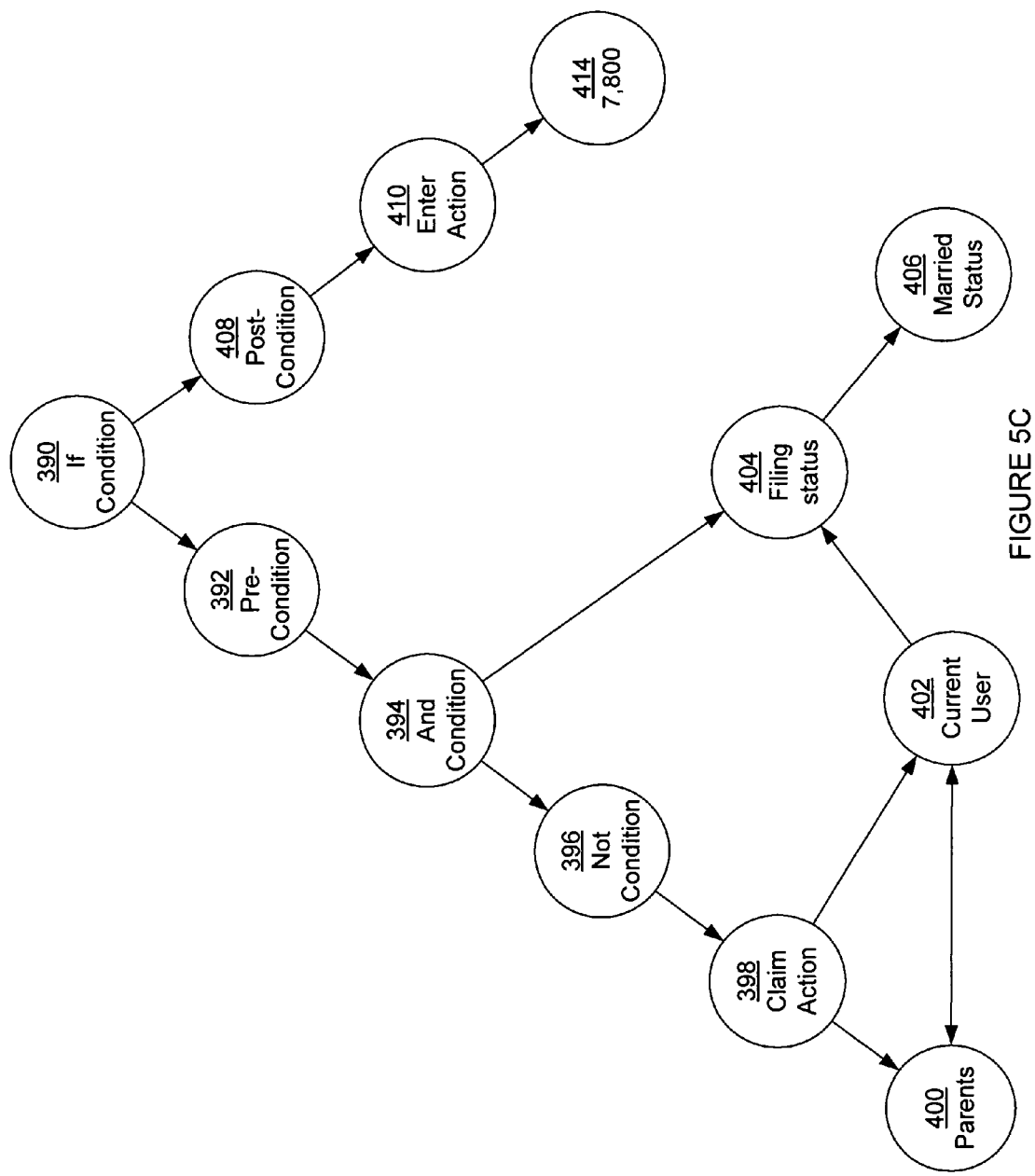

An instantiated concept map may be created using the sentence subparts. FIG. 5C shows an instantiated concept map in accordance with one embodiment of the invention. The instantiated concept map may be created by starting with the "if" functional word. In a concept map, an "if" clause has a pre-condition denoted by the subordinating clause and a post condition denoted by the main clause. Accordingly, the "if" and "," functional words map to nodes representing an "if" condition (390), a "pre-condition" (392), and a "post-condition" (408). The first component in the pre-condition is a functional word "and". Accordingly, an instantiated concept (e.g., "and" condition (394)) and the sentence subparts associated with the "and" condition are outputted for the "and" word. Specifically, the word "your" maps to current user (402), "parents" maps to parents (400), and "claim" maps to claim action (398) which modifies both the current user and the parents. "Cannot" maps to the "not" condition (396) and modifies the claim action (398).

The second sentence subpart for the "and" condition is "your filing status is married". "Married" maps to married status (406) and modifies the words "filing status". "Filing status" maps to filing status (404) and is associated with the "and" condition. "Your" maps to the current user (402) that has been already outputted. Accordingly, a relationship line is drawn between current user (402) and filing status (404).

Next, the second sentence subpart is outputted onto the instantiated concept map. The second sentence subpart has an "enter" that maps to "enter" action (410). The "7,800" maps to "7,800" (414) and modifies the "enter" action (410). Thus, the "enter" action and "7,800" are related on the instantiated concept map. After creating the instantiated concept map, a language independent representation of the sentence is available. Accordingly, the code may be generated from the instantiated concept map. FIG. 5D shows example mapping rules for generating code in accordance with one or more embodiments of the invention.

Traversing the instantiated concept map in FIG. 5C may be performed starting with the "if" condition (390). As shown in the table of FIG. 5D, when an "if" condition (430) is encountered, the "if" operator is outputted along with a pre-condition and a post condition. At this stage, the generated code is:

if (,);

After outputting the "if" condition (390), the instantiated concept map is traversed to the next instantiated concept node that is the pre-condition of the "if" condition (i.e., "and" condition (394) in FIG. 5C). As shown in the table of FIG. 5D, when an "and" condition (430) is encountered, the "and" operator is outputted along with a left condition and a right condition. At this stage, the generated code is:

if (and (,),);

After outputting the "and" condition (394), the instantiated concept map is traversed to the next instantiated concept node that is the left condition of the "and" condition (i.e., "not" condition (396) in FIG. 5C). As shown in the table of FIG. 5D, when a "not" condition (434) is encountered, the "not" operator is outputted along with a sub-condition. At this stage, the generated code is:

if (and (not ( ),),);

After outputting the "not" condition (396), the instantiated concept map is traversed to the next instantiated concept node that is the sub-condition of the "not" (i.e., "claim action" (398) in FIG. 5C). As shown in the table of FIG. 5D, when a "claim action" (436) is encountered, the "CanClaim" operator is outputted along with a subject and an object. At this stage, the generated code is:

if (and (not (CanClaim (,)),),);

After outputting the "Claim Action" (396), the instantiated concept map is traversed to the next instantiated concept node that is the subject of the "CanClaim" (i.e., "parents" (400) in FIG. 5C. The word "parents" is outputted. At this stage, the generated code is:

if (and (not (CanClaim (Parents,)),),);

After outputting the word "parents", instantiated concept map is traversed to the next instantiated concept node that is the object of the "CanClaim" (i.e., "current user" in FIG. 5C). The word "person" is outputted. At this stage, the generated code is:

if (and (not (CanClaim (Parents, Person)),),);

After outputting the word "person", the instantiated concept map is traversed to the next instantiated concept node that is the right condition of the "and" condition (i.e., "filing status" (404) in FIG. 5C. As shown in the table of FIG. 5D, when a "filing status" (438) is encountered, the person context, the "FilingStatus" attribute, the "==", and the attribute value are outputted. At this stage, the generated code is:

if (and (not (CanClaim (Parents, Person)), (person.FilingStatus=="SingleStatus)),);

After outputting the "pre-condition" of the "if" condition (390), the instantiated concept map is traversed to the next instantiated concept node that is the post-condition of the "if-condition" (i.e., "enter action" (398) in FIG. 5C). As shown in the table of FIG. 5D, when a "enter action" (436) is encountered, the current field context, "==", and attribute value are outputted. At this stage, the generated code is:

if (and (not (CanClaim (Parents, Person)), (person.FilingStatus=="SingleStatus)), current_field==7,800);

As shown in the aforementioned example, by traversing the instantiated concept map code may be easily generated. Those skilled in the art will appreciate that while the aforementioned example uses the programming language described above, code in other programming languages may also be generated.

Figure 6:
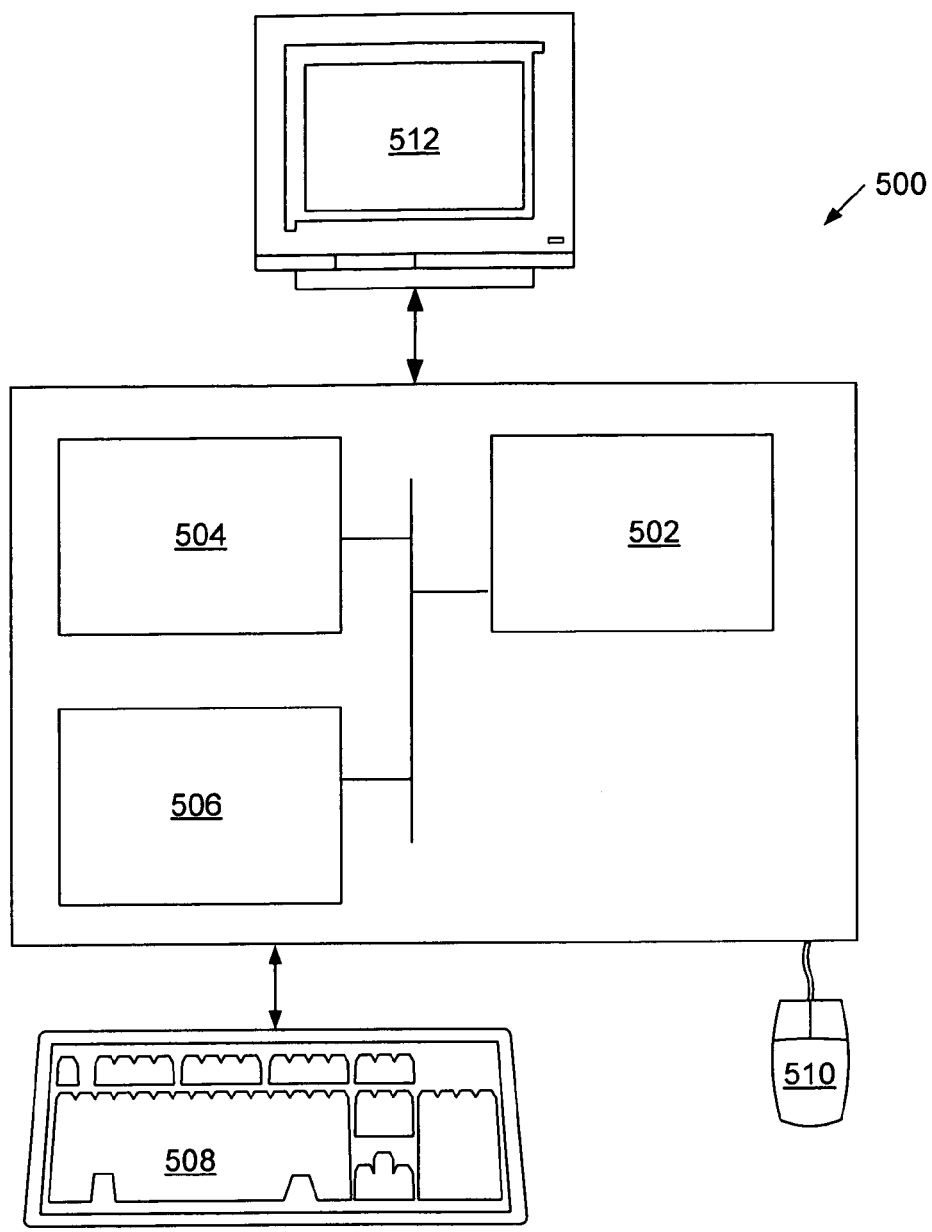
FIG. 6 shows a computer system in accordance with one or more embodiments of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., Natural Language Parser, Normalizer, Structure Rules, Concept Map, and other such components) may be located on a different node within the distributed system.

In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for quick code generation. Specifically, converting instructions into a document is performed regularly because of the ever-changing forms. By performing the code generation from the instructions, the code obtained faster and with no human error.

Further, embodiments of the invention use an instantiated context map that may be used to both model a variety of natural languages and generate a variety of programming language. By including the intermediate step of creating an instantiated concept map, the same concept map may be used for a variety of programming languages by simply changing the mapping rules. Similarly, by changing the concept map, structure rules, and natural language parser, different natural languages may be used to generate the code.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automatic code generation comprising:

obtaining a parse tree, wherein the parse tree represents at least one instruction and wherein the instruction is in a natural language, and wherein the at least one instruction is free-form;

identifying a functional word in the parse tree;

identifying a regular expression matching the functional word, wherein the regular expression matches the functional word when the regular expression comprises at least one selected from a group consisting of a concept with a matching name as the functional word and a concept with a matching type as the functional word, and wherein the regular expression specifies a sentence subpart corresponding to the functional word;

identifying the sentence subpart from the parse tree according to the regular expression and based on an identifier of the sentence subpart at a same distance from the root as an identifier of the functional word;

creating, using a processor, a first instantiated concept for the sentence subpart by:

obtaining a first concept based on the first concept mapping to a first word in the sentence subpart, wherein the first concept assigns a type to the first word, and creating the first instantiated concept from the first concept;

inserting the first instantiated concept in an instantiated concept map, wherein the instantiated concept map defines relationships between instantiated concepts in the instantiated concept map;

identifying, using a processor, a second instantiated concept for the sentence subpart by:

obtaining a second concept based on the second concept mapping to a second word in the sentence subpart, wherein the second concept is obtained based on the second concept comprising a parameter identifying the first concept, and wherein the second concept maps to a plurality of heterogeneous words, and determining that the second instantiated concept representing the second concept is already located in the instantiated concept map;

inserting, in the second instantiated concept already located in the instantiated concept map, a link to the first instantiated concept based on the second concept comprising the parameter identifying the first concept, wherein inserting the link creates at least two paths between at least two instantiated concepts in the instantiated concept map;

traversing the instantiated concept map,
wherein traversing the instantiated concept map comprises for each instantiated concept in the instantiated concept map: obtaining a code output rule according to the instantiated concept; and outputting code to memory according to the code output rule.

2. The method of claim 1, further comprising:
normalizing the parse tree to identify the functional word.

3. The method of claim 2, wherein normalizing the parse tree comprises removing at least one filler word from the parse tree.

4. The method of claim 1, wherein obtaining the parse tree comprises using the Stanford natural language parser.

5. The method of claim 1, wherein the first concept comprises a property and a name.

6. The method of claim 5, wherein the property denotes an inheritance relationship.

7. A method for generating executable code to process a form comprising:

obtaining the form, wherein the form comprises a plurality of fields;

obtaining an instruction for each field in the plurality of fields, wherein the instruction is written in a natural language, and wherein the instruction is free-form; and generating, using a processor, code for the instruction for each field in the plurality of fields to obtain generated code, wherein the generated code processes the form, wherein, for the instruction in at least one field of the plurality of fields, generating code comprises performing:

obtaining a parse tree representing the instruction;
identifying a functional word from the parse tree;
identifying a regular expression matching the functional word, wherein the regular expression matches the functional word when the regular expression comprises at least one selected from a group consisting of a concept with a matching name as the functional word and a concept with a matching type as the functional word, and wherein the regular expression specifies a sentence subpart corresponding to the functional word;

identifying the sentence subpart from the parse tree according to the regular expression and based on an identifier of the sentence subpart at a same distance from the root as an identifier of the functional word;

creating a first instantiated concept for the sentence subpart by:
obtaining a first concept based on the first concept mapping to a first word in the sentence subpart, wherein the first concept assigns a type to the first word, and
creating the first instantiated concept from the first concept;

inserting the first instantiated concept in an instantiated concept map, wherein the instantiated concept map defines relationships between instantiated concepts in the instantiated concept map;

identifying, a second instantiated concept for the sentence subpart by:
obtaining a second concept based on the second concept mapping to a second word in the sentence subpart, wherein the second concept is obtained based on the second concept comprising a parameter identifying the first concept, and wherein the second concept maps to a plurality of heterogeneous words, and determining that the second instantiated concept representing the second concept is already located in the instantiated concept map;

inserting, in the second instantiated concept already located in the instantiated concept map, a link to the first instantiated concept based on the second concept comprising the parameter identifying the first concept, wherein inserting the link creates at least two paths between at least two instantiated concepts in the instantiate concept map;

traversing the instantiated concept map,
wherein traversing the instantiated concept map comprises for each instantiated concept in the instantiated concept map: obtaining a code output rule according to the instantiated concept; and outputting code according to the code output rule.

8. A system for automatic code generation comprising:
a processor;
a pattern matcher, executing on the processor, and configured to:
obtain a parse tree, wherein the parse tree represents at least one instruction and wherein the instruction is in a natural language;

identify a functional word in the parse tree;
identify a regular expression matching the functional word, wherein the regular expression matches the functional word when the regular expression comprises at least one selected from a group consisting of a concept with a matching name as the functional word and a concept with a matching type as the functional word, and wherein the regular expression specifies a sentence subpart corresponding to the functional word;

identify the sentence subpart from the parse tree according to the regular expression and based on an identifier of the sentence subpart at a same distance from the root as an identifier of the functional word;

create a first instantiated concept for the sentence subpart by:
obtaining a first concept based on the first concept mapping to a first word in the sentence subpart, wherein the first concept assigns a type to the first word, and
creating the first instantiated concept from the first concept;

inserting the first instantiated concept in an instantiated concept map, wherein the instantiated concept map defines relationships between instantiated concepts in the instantiated concept map;

identifying a second instantiated concept for the sentence subpart by:
obtaining a second concept based on the second concept mapping to a second word in the sentence subpart, wherein the second concept is obtained based on the second concept comprising a parameter identifying the first concept, and wherein the second concept maps to a plurality of heterogeneous words, and determining that the second instantiated concept representing the second concept is already located in the instantiated concept map; and insert, in the second instantiated concept already located in the instantiated concept map, a link to the first instantiated concept based on the second concept comprising the parameter identifying the first concept, wherein inserting the link creates at least two paths between at least two instantiated concepts in the instantiated concept map; and a code generator, executing on the processor, and configured to:

traverse the instantiated concept map, wherein traversing the instantiated concept map comprises:

for each instantiated concept in the instantiated concept map obtaining a code output rule according to the instantiated concept; and output code according to the code output rule.

9. The system of claim 8, further comprising:

a normalizer, executing on the processor, and configured to normalize the parse tree to identify the functional word.

10. The system of claim 9, wherein normalizing the parse tree comprises removing at least one filler word from the parse tree.

11. The system of claim 8, wherein the first concept comprises a property and a name.

12. The system of claim 11, wherein the property denotes an inheritance relationship.

13. A computer readable medium comprising computer program code stored therein for causing a computer system accessing the computer readable medium to:

obtain a parse tree, wherein the parse tree represents at least one instruction and wherein the instruction is in a natural language, and wherein the instruction is free-form;

identify a functional word in the parse tree;

identify a regular expression matching the functional word, wherein the regular expression matches the functional word when the regular expression comprises at least one selected from a group consisting of a concept with a matching name as the functional word and a concept with a matching type as the functional word, and wherein the regular expression specifies a sentence subpart corresponding to the functional word;

identify a sentence subpart from the parse tree according to the regular expression and based on an identifier of the sentence subpart at a same distance from the root as an identifier of the functional word;

create a first instantiated concept for the sentence subpart by:

obtaining a first concept based on the first concept mapping to a first word in the sentence subpart, wherein the first concept assigns a type to the first word, and creating the first instantiated concept from the first concept;

insert the first instantiated concept in an instantiated concept map, wherein the instantiated concept map defines relationships between instantiated concepts in the instantiated concept map;

identify a second instantiated concept for the sentence subpart by:

obtaining a second concept based on the second concept mapping to a second word in the sentence subpart, wherein the second concept is obtained based on the second concept comprising a parameter identifying the first concept, and wherein the second concept maps to a plurality of heterogeneous words, and determining that the second instantiated concept representing the second concept is already located in the instantiated concept map;

insert, in the second instantiated concept already located in the instantiated concept map, a link to the first instantiated concept based on the second concept comprising the parameter identifying the first concept, wherein inserting the link creates at least two paths between instantiated concepts in the instantiated concept map;

traverse the instantiated concept map, wherein traversing the instantiated concept map comprises for each instantiated concept in the instantiated concept map: obtaining a code output rule according to the instantiated concept; and output code according to the code output rule.

* * * * *